United States Patent [19]

Dettelbach et al.

[11] Patent Number: 4,535,965

[45] Date of Patent: Aug. 20, 1985

[54] APPARATUS FOR MOLDING A PROFILED BODY

[75] Inventors: Alfred Dettelbach, Stuttgart; Gerhard Gresser, Oberboihingen; Gerhard Einsele, Nuertingen, all of Fed. Rep. of Germany

[73] Assignee: Reich Spezialmaschinen GmbH, Nuertingen, Fed. Rep. of Germany

[21] Appl. No.: 597,932

[22] Filed: Apr. 9, 1984

[30] Foreign Application Priority Data

Apr. 15, 1983 [DE] Fed. Rep. of Germany ....... 3313650

[51] Int. Cl.3 .......................... B29C 1/00; B29C 1/14; B29G 1/00

[52] U.S. Cl. ...................................... 249/83; 249/122; 249/127; 425/117; 425/436 R

[58] Field of Search .................... 264/219; 249/83, 85, 249/96, 97, 122, 124, 142, 146, 147, 150, 151; 425/110, 127, 436 R

[56] References Cited

U.S. PATENT DOCUMENTS 2,009,602 7/1935 Bauer .................................. 249/124
3,110,074 11/1963 Menzel et al. ...................... 249/151
3,279,740 10/1966 Long .................................. 249/151
3,355,772 12/1967 Kolberg .............................. 249/142
3,624,885 12/1971 Holliday et al. .................... 425/110
4,123,033 10/1978 Joelson ................................ 249/144
4,159,829 7/1979 Ditcher ............................... 277/34.3
4,434,962 3/1984 Bleuel et al. ........................ 277/34.3

FOREIGN PATENT DOCUMENTS 3144077 1/1984 Fed. Rep. of Germany .

*Primary Examiner*—Willard E. Hoag
*Attorney, Agent, or Firm*—W. G. Fasse; D. H. Kane, Jr.

[57] ABSTRACT

A molded body having a profiled cross-section, such as a grinding or polishing tool, is cast in a mold by pouring foaming synthetic material into a molding cavity closable on all sides except for holes in the end walls of the molding cavity through which a contouring insert member having a profiled surface extends to pass through the entire molding cavity and possibly even through several molding cavities arranged in axial alignment with one another. A sealing device (22) is provided adjacent each end wall for closing and sealing the profiled gap between the contouring insert member and the hole in the adjacent end wall. The sealing devices are adjustable to differently profiled inserts and assure that a molded body or tool is produced which has precise, prismatic and parallel surfaces and edges.

8 Claims, 9 Drawing Figures

APPARATUS FOR MOLDING A PROFILED BODY

CROSS-REFERENCE TO RELATED APPLICATION

The present application is related to U.S. Ser. No. 436,311, filed on Oct. 25, 1982 for a sanding tool and method of making such a tool.

FIELD OF THE INVENTION

The invention relates to an apparatus for molding a profiled body, especially a body which forms a grinding or polishing tool, at least one surface of which is provided with grinding or polishing material, for example, for finishing wood moldings having a predetermined profile or contour.

DESCRIPTION OF THE PRIOR ART

The above mentioned U.S. Ser. No. 436,311 corresponding to German Ser. No. P 31 44 077.0 describes a molding apparatus for manufacturing such sanding or finishing tools. According to the prior art a contouring insert member is secured to the bottom plate of the molding apparatus in which the foaming or molding takes place. The contouring insert member carries on its profiled surface a grinding or polishing tape. The mold cavity is enclosed by closed wall elements so that the contouring insert member cannot be longer than the spacing between two end walls. If the contouring insert member should happen to be slightly shorter than said spacing, then a gap is formed between the end surfaces of the insert member and the next adjacent end wall of the molding cavity. If now the foaming material is introduced into the molding cavity, it can happen that the foaming material enters into the gap between the end surfaces of the insert member and the next adjacent end wall surface. As a result, it has happened that the foaming material lifts the grinding or polishing tape or belt off the contoured insert member. This problem can be solved by maintaining close tolerances. Accordingly, the apparatus of U.S. Ser. No. 436,311 is quite suitable for its intended purpose. However, the prior art apparatus is not suitable for molding or casting a plurality of such molded bodies simultaneously.

OBJECTS OF THE INVENTION

In view of the above it is the aim of the invention to achieve the following objects singly or in combination:

to provide a molding apparatus for molding or casting a sanding or polishing tool in a molding cavity in which the grinding or polishing tape or belt is securely held against the contouring insert member during the foaming and curing operation without forming a gap between the end surfaces of the contouring insert member and the next adjacent end wall surface;

to construct the end walls of the mold cavity in such a manner that the insert member may extend entirely through the end walls and through the molding cavity so that a plurality of such molding cavities may be arranged in axial alignment along a common profiled or contoured insert member;

to manufacture tools of the type described herein as precisely as possible, yet in a very economical manner; and to provide a sealing device which has an adjustable contour so that insert members having different contours may be used in the same molding cavity or cavities.

SUMMARY OF THE INVENTION

According to the invention there is provided a molding apparatus for casting or molding a molded body, especially a grinding or polishing tool, which apparatus has a base plate on which the molding cavity enclosing wall elements are mounted in a removable manner and on which further a contoured insert member is mounted which has a profiled surface corresponding to the profiled surface of a work piece that is to be finished by the tool cast in the mold cavity. The wall elements include end walls provided with holes through which the contoured insert member extends in the longitudinal direction. The holes in the end walls do not conform to the contoured surface of the insert member. Thus, an adjustable sealing device having at least one edge adjustable in its contour is provided for closing the holes in the side walls above the contoured surface of the insert member.

It is an advantage of the invention that the profiled insert member can now be longer than the spacing between the inwardly facing surfaces of the end walls of the molding cavity. In fact, the insert member can now extend outside both end walls and through several mold cavities in common. Further, close tolerances need not be maintained for the holes in the end walls so that these holes can be larger than the cross-sectional dimensions of the insert member.

Due to the adjustability of the shape or contour of the sealing device edge in contact with the contoured surface of the insert member, it is now possible to properly close the mold cavity and properly hold the grinding or polishing tape or belt in position against the contoured surface of the insert member even during the foaming and curing operation. These features assure that upon completion of the foaming and curing the resulting grinding or polishing tool has the desired prismatic and parallel surfaces and edges.

According to a preferred embodiment of the invention the sealing device comprises a plurality of sealing elements in the form of flat lamellae made of synthetic material and arranged in contact with each other, but slidable relative to each other prior to their being clamped into an adjusted sealing position. Each of these lamellae has a thickness of about 2 mm which has been found to assure an adequate sealing function.

Since it is now possible to extend a single continuous contoured insert member through more than one molding cavities, a common base plate may carry two or more such molding devices arranged in a row, whereby the insert member has a sufficient length to pass through all such molding cavities. With this type of arrangement it is possible to manufacture two identical grinding or polishing tools simultaneously. This feature has the further advantage that the identical tools resulting from casting with the aid of a common insert member are ideally suitable for use in pairs in conventional profile grinding or polishing machines. It has been found that the common insert member with its contour makes sure that the resulting polishing or grinding tools forming a pair will also precisely align with one another in the polishing or grinding machine, thereby assuring a fault-free profile polishing or grinding.

Instead of using a plurality of lamellae made of synthetic material for the sealing device, it is also possible to use an air pressure cushion for the sealing purpose. In yet another version it is possible to use a cushion of a foam type elastic material instead of the lamellae. Such elastic foam type material may even be combined with the synthetic material lamellae. For example, a strip of elastic material may be inserted between the bottom edges of the lamellae which form a stairstep configuration on one side of the elastic strip, the other side of which contacts the contoured surface of the insert member.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 9:
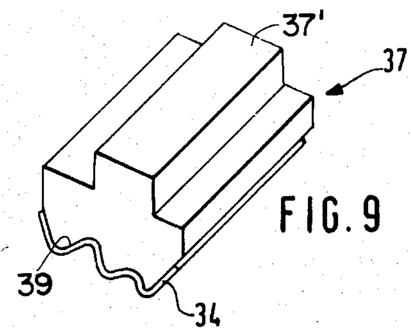
FIG. 9 shows a molded body in the form of a grinding or polishing tool made in a molding apparatus according to the invention.

Referring first to FIG. 9, the tool 37 manufactured in a molding device according to the invention comprises a cast or molded body 37' having precise prismatic surfaces and parallel edges. The body 37' is made of a foamable and curable material, for example, polyurethane or the like, open-cell or close-cell material. The body 37' has a contoured surface 39 facing downwardly and having attached thereto an elastic tape or belt 34 which is secured to the contoured surface 39 as a result of the curing of the body 37' and which has bonded to its outwardly facing surface the grinding or polishing particles by a conventional adhesive.

Figure 1:
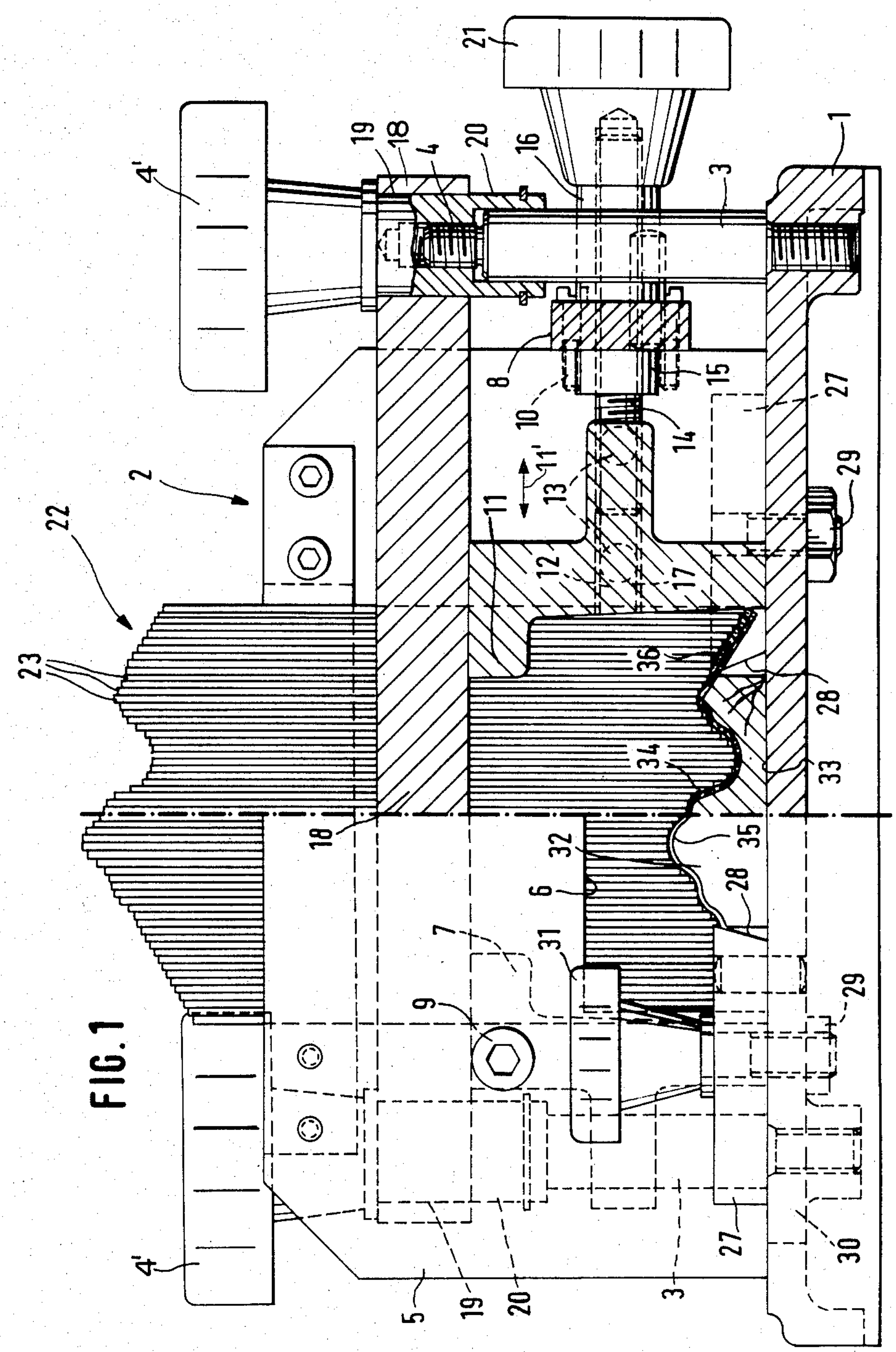
FIG. 1 is an end view of a molding apparatus according to the invention, whereby the right-hand portion is shown in section along section line I—I in FIG. 2.
Figure 2:
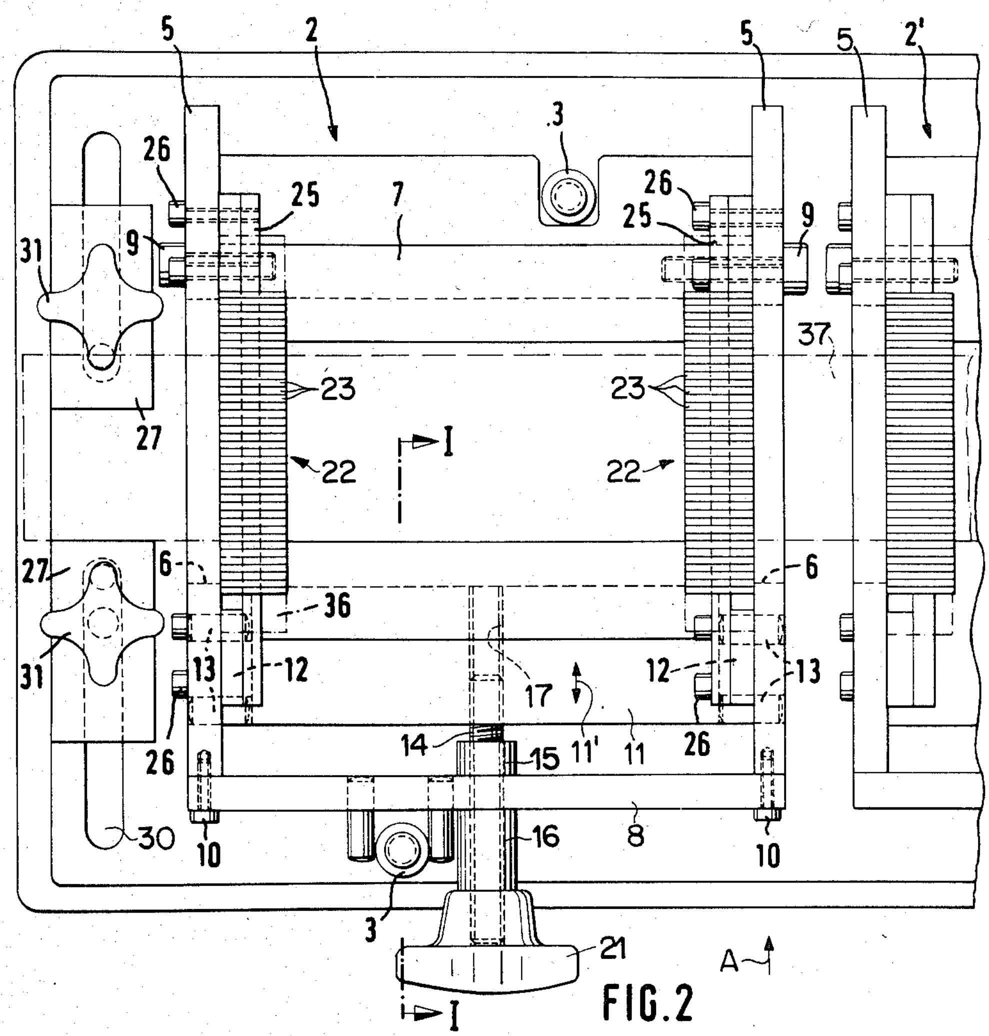
FIG. 2 is a top plan view onto the molding apparatus of FIG. 1 with the cover plate removed and also showing a portion of a second molding device which is identical to the molding device fully shown in FIG. 2.
Figure 3:
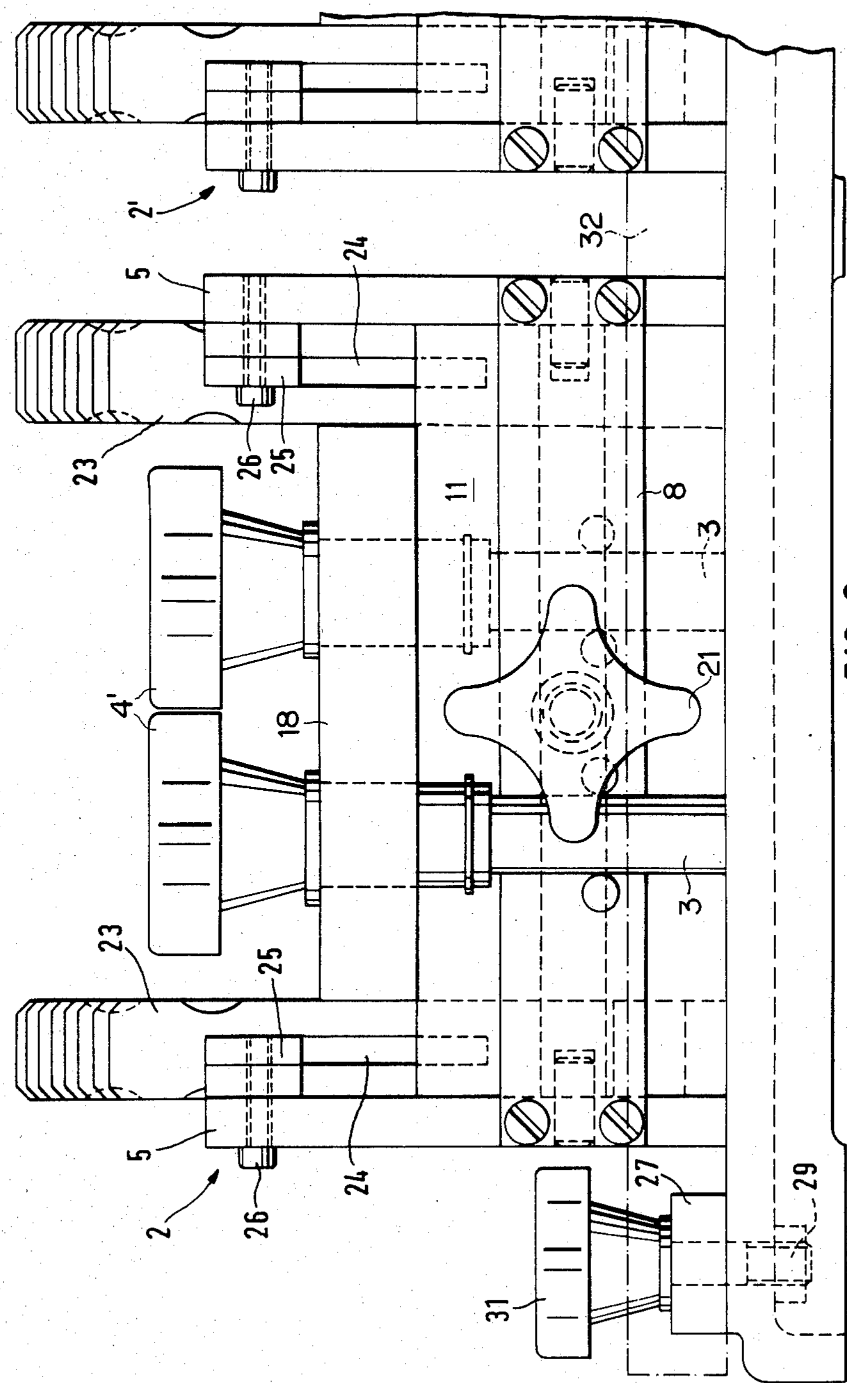
FIG. 3 shows a side view of the apparatus of FIG. 2 in the direction of the arrow A.

Referring now to FIGS. 1, 2, and 3, the present molding device for casting, foaming and curing two molded bodies simultaneously, for example, comprises two identical molds 2,2'. The molds 2,2' are mounted on a common base plate 1 in a removable manner. Two mounting columns 3 are screwed into respective threaded holes in the base plate 1 for each mold 2,2'. The upper ends of the mounting columns 3 have threaded studs 4 for the securing of a cover plate 18 shown in FIG. 8. Two nuts 4' engage the threaded studs 4 to hold the cover plate 18 in place during the foaming and curing of the mold body or tool 37.

Figure 4:
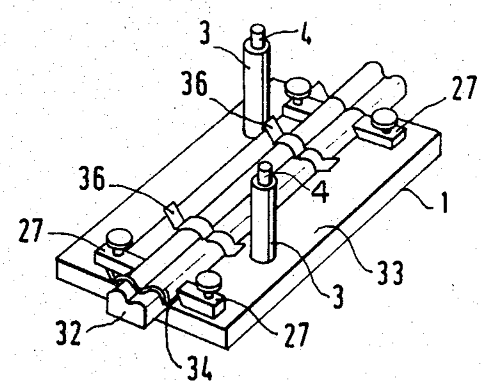
FIG. 4 shows a perspective view of the base plate with the contoured insert member secured to the base plate prior to the assembly or mounting of the wall components forming the molding cavity.
Figure 5:
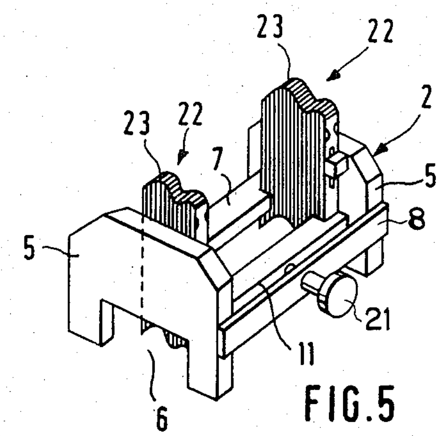
FIG. 5 shows a perspective view of the wall components and of the sealing device prior to its mounting on the base plate shown in FIG. 4.
Figure 8:
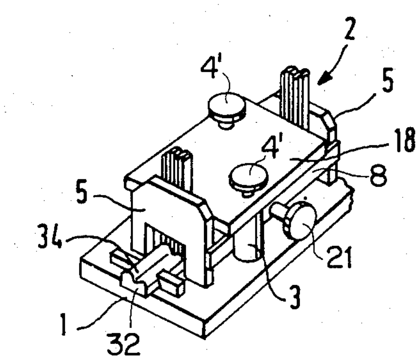
FIG. 8 shows the molding apparatus with the cover plate attached thereto during the foaming and curing.

The molding cavity in each mold 2 is formed by the upwardly facing surface 33 of the base plate 1 shown in FIG. 4 and by the downwardly facing surface of the cover plate 18 shown in FIG. 8 as well as by two side wall members 7 and 11 and by end wall members 5. The shape of the end wall members with the holes 6 therein is best seen in FIG. 5.

The side wall member 7 interconnects the end walls 5 on one side thereof with the aid of screws 9. The opposite edges of the two end wall members 5 are interconnected by a cross-member 8 secured to the edges of the end wall members 5 by screws 10. The side wall member 11 is arranged to reach into the spacing between the inwardly facing surface of the end wall members 5. The side wall members 7 and 11 have both the same cross-sectional configuration or profile. The end wall member 11 is provided with two grooves 12 adjacent its ends for cooperation with two guide lugs 13 secured to the respective end wall 5. Each end wall carries two guide lugs 13 riding in the respective groove 12 of the side wall 11.

The side wall element 11 is adjustable back and forth in the direction of the double arrow 11' by means of a threaded spindle 14 rotatably supported in the cross bar 8 and rotatable in threaded bushings 15 and 16 on opposite sides of the cross bar 8. The threaded spindle 14 engages into a threaded hole 17 of the side wall member 11. The outer free end of the spindle 14 is provided with a handle 21, whereby rotation of the handle 21 permits the proper adjustment of the wall member 11.

According to the invention the holes 6 above the profiled surface 35 of a contoured insert member 32 are closed by a sealing device 22 comprising a plurality of individual flat lamellae 23. The profiled surface 35 of the insert member 32 forms a second profiled surface as compared to the first profiled surface 39 of the finished tool 37 shown in FIG. 9. Initially, the flexible elastic tape or belt 34 is placed on top of the profiled surface 35 of the insert member 32 with the grinding and polishing particles facing the body 32. Thereafter, the sealing lamellae 23 are pushed downwardly until the lower edges contact the tape or belt 34, thereby pressing the tape or belt 34 tightly against the surface 35. Since the lower edges of the lamellae 23 form a stairstep configuration it is desirable to insert a strip 36 of elastically yielding synthetic material between the lower edges of the lamellae 23 and the tape 34 for an improved sealing. The lamellae 23 seen in the left-hand portion of FIG. 1 are those seen in the front portion of FIG. 5. The lamellae 23 seen in the right-hand portion in FIG. 1 are those shown in the rear of FIG. 5.

Figure 6:
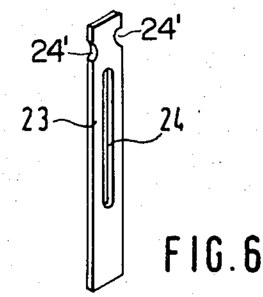
FIG. 6 shows a single lamella, a plurality of which form the sealing device according to the invention.

The lamellae 23, one of which is individually shown in FIG. 6, are provided with longitudinal slots 24 which permit the vertical up and down adjustment of each lamellae independently of any other lamellae for adapting or adjusting the lower edge contour of a package of lamaella to the surface 35. These lamellae may, for example, be made of synthetic material. The longitudinal slot 24 receives a holding or mounting bail 25 secured with screws 26 to the end walls 5 as shown in FIG. 2. Since the vertical thickness of the bail 25 is substantially narrower than the vertical length of the slots 24 it is possible to shift each individual lamella as described. The notches 24' at the top of each lamella facilitate the gripping of each individual lamella for its adjustment.

At each end of a mounting location on the base plate 1 there are provided clamping claws 27 provided with slanted clamping surfaces 28 for holding the insert member 32 in place as best seen in FIG. 1. In order to accommodate different sizes of insert members 32, the base plate is provided with longitudinal slots 30 for the individual adjustment of the clamping claws 27 with the aid of clamping screws 31 cooperating with respective nuts 29 secured to the bottom of the base plate 1.

For manufacturing a pair of two tools 37 as shown in FIG. 9, the first step is to secure the prismatic contoured insert member 32 on the top surface 33 of the base plate 1. Prior to tightening the clamping claws 27 the highly elastic and flexible grinding or polishing belt or tape 34 is also placed on top of the contoured surface or profiled surface 35 of the insert member 32 and then held in place by tightening the clamping claws 27 with the aid of the screws 31 engaging the nuts 30. Two sealing strips 36 are then positioned as shown in FIG. 4 so that they may be engaged by the lower edges of the lamellae 23 forming the sealing devices 22 as shown in FIG. 5. Upon completion of the just enumerated steps, the side walls 7 and 11 and the end walls 5 are placed in position on the base plate 1 as a unit which is shown in FIG. 5. With the side and end walls in position as best seen in FIG. 7, the insert member 32 passes through the holes 6 in both end walls 5 and extends out of these end walls and into the next adjacent mold 2' shown in FIGS. 2 and 3 on the right-hand side of these figures.

As long as the side wall element 11 is retracted, it is possible to insert the lamellae 23 and shift them individually downwardly until their lower edges contact the belt or tape 34, or rather, the sealing strip 36 which is glued to the belt or tape 34, whereby the gap between the contoured surface 35 and the respective hole 6 is properly sealed. The sealing strip 36 is sufficiently elastic to even fill the smallest step-type gaps between adjacent lamellae 23 and the insert member 32. Once the package or group of lamellae 23 has been adjusted as described, the wall element 11 is moved toward both side portions of the lamella packages simultaneously, thereby compressing the lamella packages, whereupon the lamellae 23 in cooperation with the sealing strip 36 completely seal the holes 6 and thus the mold cavity since they also press the tape or belt 34 against the contoured or profiled surface 35 of the insert member 32.

Figure 7:
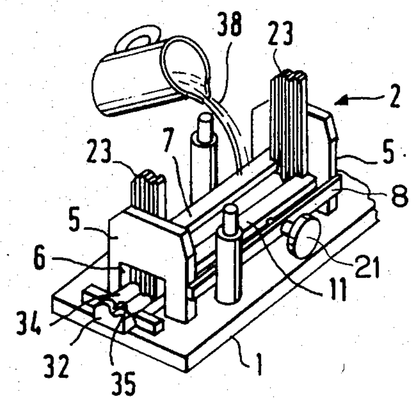
FIG. 7 illustrates the wall components of FIG. 5 mounted on the base plate forming a molding cavity ready to be filled by a foaming and curing synthetic material.

As shown in FIG. 7, the foamable synthetic material 38 is now poured into the cavity of the still open mold 2. Once the proper quantity has been filled into the mold cavity the cover plate 18 is put in place and the nuts 4' are tightened on the threaded studs 4 of the mounting columns 3 as shown in FIG. 8. Thus, the mold cavity is completely enclosed between the top surface 33 of the base plate 1, the end walls 5, the wall elements 7,11 and the cover plate 18 so that the synthetic material 38 can now foam and cure to thereby solidify, whereby the grinding or polishing tape or belt 34 is simultaneously bonded to the foamed material as a result of the curing of the foamed material.

When the curing is completed, the finished tool 37 is removed by first removing the cover plate 18 and then removing the tool 37 after said side wall member 11 was moved outwardly by loosening the spindle 14, thereby facilitating the easy removal of the finished tool 37.

Although the invention has been described with reference to specific example embodiments, it will be appreciated, that it is intended, to cover all modifications and equivalents within the scope of the appended claims.

What is claimed is:

1. A molding apparatus for casting a molded body such as a grinding or polishing tool having at least one contoured surface complementary to a first profiled surface of a work piece to be ground or polished by said tool, comprising a base plate, side walls, a cover plate and two end walls facing each other for forming at least one molding cavity, each end wall having a hole therein, an elongated contouring insert member extending longitudinally through said holes in said end walls so as to pass longitudinally through said molding cavity, said contouring insert member having a second profiled surface corresponding to said first profiled surface of a work piece, and adjustable sealing means having at least one edge adjustable in its contour so that said one adjustable edge defines a contour substantially conforming to said second profiled surface of said insert member for sealingly closing each hole in said end walls, and wherein each said adjustable sealing means comprise a plurality of substantially planar sealing elements which are individually adjustable in their position relative to each other in a direction extending perpendicularly to said base plate, said molding apparatus further comprising means for adjustably mounting said sealing elements in said molding apparatus.

2. The molding apparatus of claim 1, wherein said sealing elements comprise flat lamellae forming two lamella packages located between said side walls, said lamella packages facing each other and extending alongside said end walls.

3. The molding apparatus of claim 1, wherein said sealing elements comprise flat lamellae each having a longitudinal slot therein for adjusting the position of each lamella individually relative to the position of any other lamella in a group of lamellae.

4. The molding apparatus of claim 1, wherein said contouring insert member carries a grinding or polishing tape or belt on said second profiled surface, said molding apparatus further comprising a sealing strip of elastically yielding material operatively interposed between said tape or belt and said adjustable edge of said adjustable sealing means.

5. The molding apparatus of claim 4, wherein said elastically yielding sealing strip is adhesively bonded to said tape or belt.

6. The molding apparatus of claim 1, further comprising clamping means arranged for cooperation with at least one of said side walls for adjusting and securing the position of said one side wall in the molding apparatus, whereby said plurality of sealing elements are pressed together, once their position has been adjusted, between said side walls.

7. The molding apparatus of claim 1, comprising a plurality of molding cavities mounted in axial alignment on said base plate provided in common for said plurality of molding cavities, said holes in said side wall of all molding cavities being arranged in alignment with one another, said contouring insert member extending in common through all said holes and through all molding cavities.

8. The molding apparatus of claim 1, wherein said holes in said end walls have a substantially rectangular cross-sectional configuration so located in the respective end wall that the hole extends along said base plate whereby said contoured insert member rests on said base plate.

* * * * *